US010796542B1

(12) United States Patent
Bennett et al.

(10) Patent No.: US 10,796,542 B1
(45) Date of Patent: Oct. 6, 2020

(54) DISCREET HAPTIC ALERTS TO MOBILE BUG FOR COVERT SESSIONS

(71) Applicant: World Emergency Network—Nevada, Ltd., Carson City, NV (US)

(72) Inventors: Christopher Ryan Bennett, St. Petersburg, FL (US); Derek Anthony Seroky, Tampa, FL (US)

(73) Assignee: WORLD EMERGENCY NETWORK—NEVADA LTD., Carson City, NV (US)

( * ) Notice: Subject to any disclaimer, the term of this patent is extended or adjusted under 35 U.S.C. 154(b) by 0 days.

(21) Appl. No.: 16/511,949

(22) Filed: Jul. 15, 2019

Related U.S. Application Data

(60) Provisional application No. 62/854,552, filed on May 30, 2019.

(51) Int. Cl.
  *G08B 5/22* (2006.01)
  *G08B 6/00* (2006.01)
  *H04W 4/90* (2018.01)
  *H04W 76/10* (2018.01)

(52) U.S. Cl.
  CPC ............... *G08B 6/00* (2013.01); *H04W 4/90* (2018.02); *H04W 76/10* (2018.02)

(58) Field of Classification Search
  None
  See application file for complete search history.

(56) References Cited

U.S. PATENT DOCUMENTS

| 10,187,518 B2 | 1/2019 | Bennett | |
|---|---|---|---|
| 10,360,775 B1* | 7/2019 | Saboune | G10L 15/22 |
| 2015/0070150 A1* | 3/2015 | Levesque | H04N 21/4325 340/407.1 |
| 2015/0170023 A1* | 6/2015 | Chatterjee | G06N 3/08 706/16 |
| 2016/0178906 A1* | 6/2016 | Rider | G02B 27/0172 726/17 |
| 2016/0189116 A1* | 6/2016 | Cattone | G06Q 10/20 705/27.2 |
| 2019/0163272 A1* | 5/2019 | Khare | G06Q 30/0641 |

\* cited by examiner

*Primary Examiner* — Adolf Dsouza
(74) *Attorney, Agent, or Firm* — Fenwick & West LLP

(57) ABSTRACT

A system and a method are disclosed for activating haptics during a one-way communications session with a mobile bug. The system may establish a one-way communications session between a mobile bug and a monitoring device, and may receive, from the monitoring device, a request to notify a user of the mobile bug of a circumstance. The system may compare data of the request to entries of a database, and may identify, based on the comparing, an entry of the request that matches the data. The system may determine a haptic output indicated by the entry, and may transmit a command to the mobile bug to vibrate according to the haptic output.

20 Claims, 6 Drawing Sheets

DISCREET HAPTIC ALERTS TO MOBILE BUG FOR COVERT SESSIONS

CROSS REFERENCE TO RELATED APPLICATIONS

This application claims the benefit of U.S. Provisional Patent Application No. 62/854,552, filed May 30, 2019, the disclosure of which is hereby incorporated by reference herein in its entirety.

TECHNICAL FIELD

The disclosure generally relates to the field of covert mobile bug applications (e.g., cellular body wire applications), and more specifically to configuring customized haptic vibrations for a mobile bug to enable a monitoring team to covertly alert a transmitting user carrying the mobile bug of a circumstance.

BACKGROUND

In covert operations scenarios where a transmitting person has audio transmitted to a monitoring team, it is risky for the transmitting person to carry a transmitting device, as the transmitting device can be discovered by a bad guy, thus compromising the transmitting person's identity and safety. Related art systems thus enable cellular telephones to be configured to act as a transmitting device, where the transmitting device initiates audio, and then the monitoring team can listen in. In such scenarios, the risk of the transmitting person being caught is reduced because it is not obvious that the cellular telephone is being used to transmit audio. However, these related art systems disable audio from the monitoring team from being output to the transmitting person in order to avoid the transmitting person's undercover nature being exposed. Thus, if the monitoring team has a critical message for the transmitting person, the monitoring team may be unable to deliver that critical message, which may expose the transmitting person to additional risk.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes outputting haptics, which may be customizable by a transmitting person carrying a mobile bug or by a member of a monitoring team, using the mobile bug. The haptics may be used to alert or warn the transmitting person to a circumstance observed by the monitoring team. For example, a transmitting person may program a mobile bug to vibrate using five short bursts when a member of a monitoring team sends an SOS signal. Because the transmitting person programmed the mobile bug with this vibration pattern, the transmitting person knows that danger is present, and knows to exit his or her current situation as quickly as possible. The customized haptics being enabled on a mobile bug enables the monitoring team to alert a transmitting person to danger and other circumstances notwithstanding audio being disabled from the monitoring team to the mobile bug, thus avoiding compromising the transmitting person's undercover position, while maintaining safety of the transmitting person.

To this end and others, one embodiment of the disclosed system, method, and computer readable medium includes activating haptics during a one-way communications session with a mobile bug by establishing a one-way communications session between a mobile bug and a monitoring device, and receiving, from the monitoring device, a request to notify a user of the mobile bug of a circumstance during the one-way communications session. The system compares data of the request to entries of a database, and identifies, based on the comparing, an entry of the request that matches the data. The system determines a haptic output indicated by the entry, and transmits a command to the mobile bug to vibrate according to the haptic output.

Mobile Bug System Environment

Figure 1:
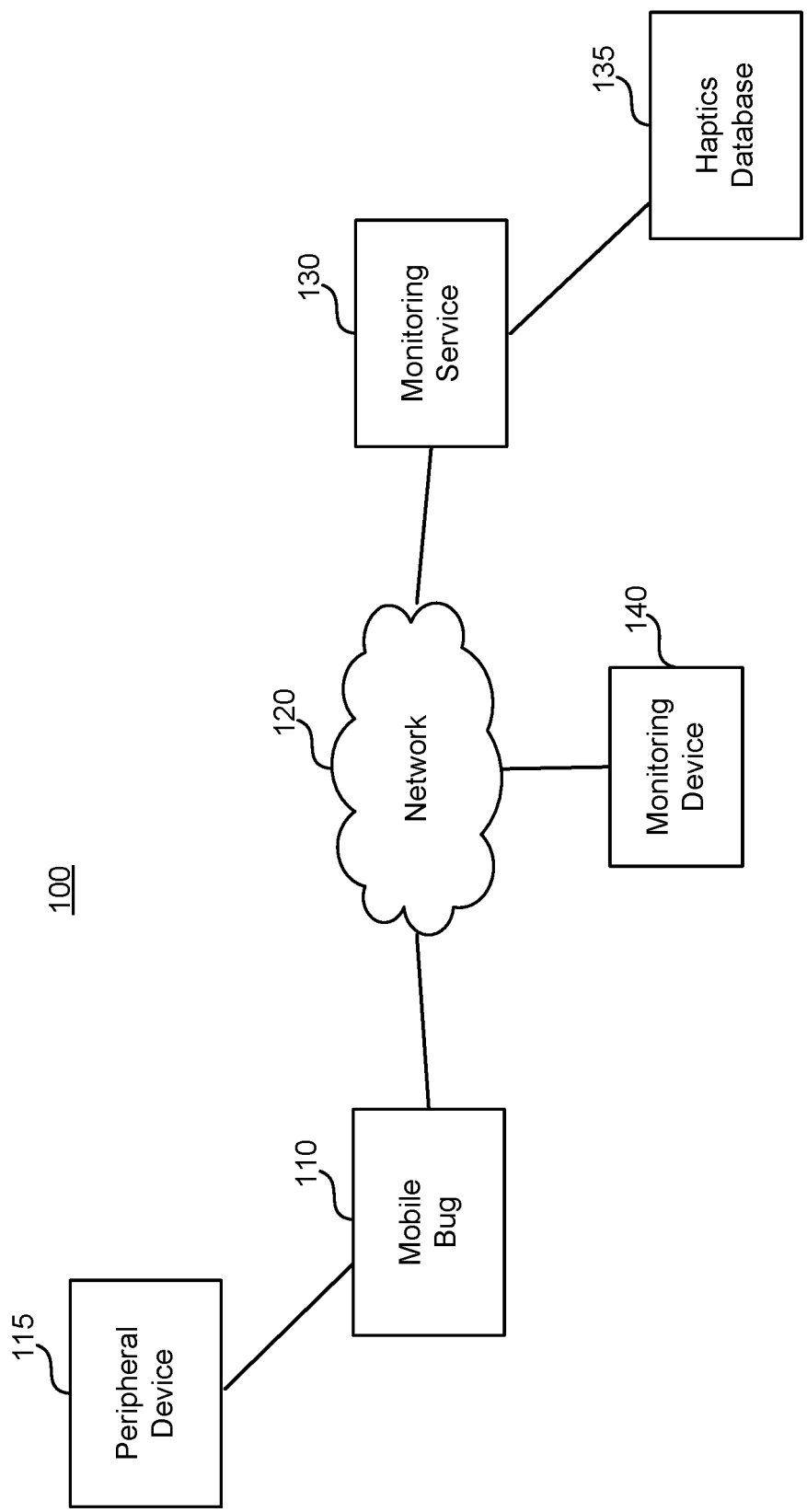
FIG. 1 illustrates one embodiment of a system environment including a mobile bug, a monitoring device, a monitoring service, and a haptics database.

FIG. 1 illustrates one embodiment of a system environment including a mobile bug, a monitoring device, a monitoring service, and a haptics database. FIG. 1 depicts environment 100, which includes mobile bug 110, peripheral device 115 network 120, monitoring service 130, haptics database 135, and monitoring device 140. Mobile bug 110 may be any client device, including but not limited to smartphones, laptops, wearable devices such as smart watches, Internet-of-Things devices, peripheral devices, and the like. While only one mobile bug 110 is depicted, several mobile bugs may be included within environment 100.

Mobile bug 110 is configured to transmit data, which may include audio, location data (e.g., GPS data), video, and any other data requested by monitoring device 140, over network 120 during a one-way communications session. The data may be transmitted over a single connection (e.g., a data component of a cellular signal, WiFi, Wide Area Network signal, or similar), or may be split across multiple connections (e.g., audio components transmitted over a public-switched telephone network; data components such as GPS and/or video transmitted over data networks, etc.). Network 120 may include infrastructure for single connection or split connection transmissions. Further functionality of network 120 is described below with reference to FIG. 5.

As used herein, the term one-way communications session may refer to a session where mobile bug 110 transmits data without outputting received data from a user interface of mobile bug 110. In an embodiment, during the one-way communications session, mobile bug 110 does not receive audio data from monitoring device 140. Alternatively, mobile bug 110 receives data from monitoring device 140 during the one-way communications session, but does not output (e.g., display or output audio through speaker) the received data. Further details about the functionality of mobile bugs are described in commonly-owned U.S. Pat. No. 10,187,518, filed May 12, 2017, and issued Jan. 22, 2019, the disclosure of which is hereby incorporated by reference herein in its entirety. Mobile bug 110 is configured to vibrate according to haptics, which may be triggered based on mobile bug or monitoring service 130 detecting a circumstance, as described further below with respect to FIGS. 2-4 and 6.

In an embodiment, mobile bug 110 is coupled to peripheral device 115. Peripheral device 115 may be any client device, and may be coupled to mobile bug 110 by way of a short-range link, such as a wireless link, or a wired link. Peripheral device 115 may perform some or all functionality described with respect to mobile bug 110. For example, peripheral device 115 may vibrate according to haptics, in addition to, or instead of, mobile bug 110 vibrating, based on instructions received from mobile bug 110, monitoring service 130, and/or monitoring device 140.

Monitoring service 130 facilitates establishment of a one-way communications session, and may facilitate haptic output at mobile bug 110 based on communications from monitoring device 140 during the one-way communications session. As will be described in further detail with reference to FIG. 3, monitoring service 130 registers mobile bug 110 as a mobile bug, and monitoring device 140 as a monitoring device. Monitoring service 130 may receive a request to establish, or reestablish, a one-way communications session between mobile bug 110 and monitoring device 140 from either mobile bug 110 or monitoring device 140. Responsive to receiving the request, monitoring service 130 transmits instructions to mobile bug 110 to output data to monitoring device 140. In an embodiment, the instructions to mobile bug 110 include instructions to output the data to monitoring service 130 (e.g., for recording the data to memory for replay at a later time, for encrypting the data before it is passed to monitoring device 140, and the like). Monitoring service 130 may be implemented within one or more servers within environment 100. Some functionality of monitoring service 130 may be distributed to mobile bug 110 and/or monitoring device 140 (e.g., through an application installed on mobile bug 110 and/or monitoring device 140).

Haptics database 135 includes database entries that correspond commands to vibration patterns that are to be output by mobile bug 110 and/or peripheral device 115. The vibration patterns may be default, or may be customized by the transmitting person or a member of the monitoring team. An example of a default vibration pattern includes use of Morse code, where certain vibration patterns represent each letter of a textual string. Another example of a default vibration pattern includes a pattern se, such as five long vibrations, when a certain command is indicated by a member of the monitoring team, such as an "SOS" command, where the transmitting person knows, because he read and memorized vibration patterns associated with an "SOS" command, that five long vibrations corresponds to an SOS command.

A customized vibration pattern is a vibration pattern customized by a user, such as the transmitting person or a member of the monitoring team. An example customized vibration pattern is a vibration pattern of three long vibrations followed by three short vibrations, where the transmitting user knows that this means the transmitting user should exit a situation as soon as possible because a monitoring team has indicated that they have what they need, because the transmitting user programmed the vibration pattern to correspond to such a scenario. While haptics database 135 is depicted as part of monitoring service 130, haptics database 135 may be stored local to mobile bug and/or monitoring device, and/or may be distributed where portions of haptics database 135 reside at any of, or each of, mobile bug 110, monitoring service 130, and monitoring device 140. Entries of haptics database 135 may indicate whether mobile bug 110, peripheral device 115, or both are to vibrate upon detection of a command indicated within haptics database 135. Further, entries of haptics database 135 may indicate whether additional information is to be output at mobile bug 110 and/or peripheral device 115 when vibrating, such as a fake text message from the transmitting person's mother that can be shown to a suspicious bad guy if the vibration causes suspicion from the bad guy. Where haptics database 135 resides at monitoring service 130, entries may indicate which mobile bug 110 and/or transmitting person programmed given entries, to ensure that vibration patterns are retrieved for the relevant person. Entries of haptics database 135 may indicate an intensity with which some or all of the vibration pattern is to be output.

Monitoring device 140 may request that a one-way communications session between mobile bug 110 and monitoring device 140 be established, or reestablished. Monitoring device 140 receives data from mobile bug 110. Monitoring device 140 may output the received data in real-time or near-real-time to one or more users of monitoring device 140 (e.g., by outputting audio using speakers operably coupled to monitoring device 140, by outputting GPS coordinates using a display operably coupled to monitoring device 140, and the like). Users of monitoring device 140 (or multiple monitoring devices 140) may be referred to herein as members of a monitoring team. Monitoring device 140 may store the received data (e.g., in encrypted fashion). During a one-way communications session, monitoring device 140 may transmit a communication to mobile bug 110 and/or monitoring service 130 that causes mobile bug 110 (and/or peripheral device 115) to vibrate according to a predefined haptics pattern. Monitoring device 140 may be any client device, such as those described with respect to mobile bug 110, as well as any non-mobile device, such as a large personal computer, a server, and the like. Other client devices are described below with reference to FIG. 5.

Mobile Bug Details

Figure 2:
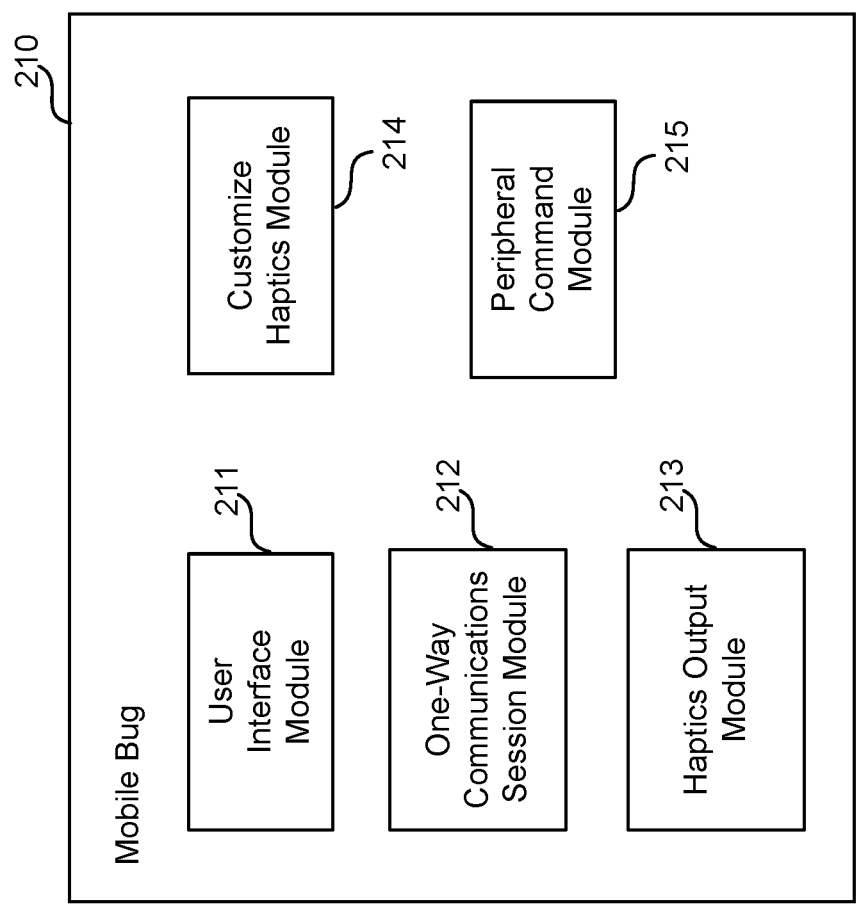
FIG. 2 illustrates one embodiment of a detailed view of modules within a mobile bug, including modules for outputting customized haptics.

FIG. 2 illustrates one embodiment of a detailed view of modules within a mobile bug. Mobile bug 210 includes the same functionality described above with respect to mobile bug 110. Mobile bug 210 includes user interface module 211, one-way communications session module 212, haptics output module 213, customize haptics module 214, and peripheral command module 215.

User interface module 211 enables user input for providing instructions, such as establishment instructions from a transmitting person to monitoring service 130, and/or instructions to add or modify entries in haptics database 135. In an embodiment, user interface module 211 may be provided by a browser that accesses a web address of monitoring service 130. User interface module 211 may be provided by an application installed to mobile bug 110 that is configured to interact with monitoring service 130 and/or haptics database 135 based on user input received from the transmitting person and/or instructions received from monitoring service 130. The transmitting person may use user interface module 211 to instruct monitoring service 130 to establish a one-way communications session between mobile bug 210 and one or more monitoring devices 140. Additionally, user interface module 211 may be used to view available default haptics, or to enable a user to input or make edits to customized haptics, the input of which is described below with respect to customize haptics module 214.

One-way communications session module 212, when executed, interacts with monitoring service 130 to establish a one-way communications session. One-way communications session module 212 may be executed based on input from user interface module 211 requesting establishment of a communications session. One-way communications session module 212 may be executed based on instructions from monitoring service 130 to the mobile bug 130 to initiate a one-way communications session (e.g., based on a request from monitoring device 140). Details of the role of mobile bug 210 in establishing a one-way communications session, or reestablishing a one-way communications session using an auto-reestablishment module (which, e.g., may instruct mobile bug 210 to redial monitoring service 130 and/or monitoring device 140) are described in further detail in commonly-owned U.S. Pat. No. 10,187,518, filed May 12, 2017, and issued Jan. 22, 2019, the disclosure of which is hereby incorporated by reference herein in its entirety.

Haptics output module 213 causes mobile bug 210 (and/or peripheral device 115) to vibrate in accordance with the instructions of entries in haptics database 135. As described with respect to FIG. 1 above, haptics database 135 may be located, in whole, or in part, within mobile bug 110. In the scenario where haptics database 135 is located within mobile bug 110, haptics output module 213 detects a command from monitoring device 140 and determines whether the command matches an entry of haptics database 135. In the scenario where haptics database 135 is located within monitoring service 130, haptics output module 213 may receive instructions on a vibration pattern from monitoring service 130, or alternatively, may receive the command itself and retrieve a vibration pattern from an entry that matches the command from haptics database 135 via monitoring service 130. The details of what is input to cause the command to be received at mobile bug 210 and/or monitoring service 130 will be described in further detail with respect to FIG. 4 below. Haptics output module 213 may determine whether the entry indicates that peripheral device 115 is to vibrate, in which case haptics output module 213 may transmit a command to peripheral command module 215 to cause peripheral device 115 to vibrate. Alternatively, haptics output module 213 may simply whether peripheral device 115 is operably coupled to mobile bug 110, in which case haptics output module 213 may command peripheral command module 215 to determine whether to cause peripheral device 115 to vibrate. In an embodiment, haptics output module 213 determines an intensity with which to vibrate based on an intensity indicated by the entry, or based on settings input by the transmitting person into mobile bug 210.

Haptics output module 213 may refrain from causing mobile bug 110 and/or peripheral device 115 to vibrate in circumstances where commands are received in rapid succession. For example, where a member of the monitoring team using monitoring device 140 issues five of the same command within thirty seconds of one another, this risks both confusing the transmitting person, who may not be able to distinguish the vibration patterns, and compromising the undercover nature of the transmitting person, as a bad guy is likely to notice the sounds of a nearly constant vibration pattern. Accordingly, haptics output module 213 may determine, when a command is received, whether the command was received within a threshold amount of time from another vibration command. In response to detecting that the command was received within the threshold amount of time, haptics output module 213 may refrain from causing mobile bug 110 and/or peripheral device 115 to vibrate; however, in response to detecting that the command was received outside the threshold amount of time, haptics output module 213 may cause mobile bug 110 and/or peripheral device 115 to vibrate.

In an embodiment, the threshold is used where the commands are the same and/or cause the same vibration pattern, where different commands that cause different vibration patterns cause the different vibration patterns to be output even when received within the threshold period. In an embodiment, multiple different thresholds may be set, where a threshold is used when a same command causing a same vibration pattern is received at least twice in succession, and where a different threshold is used when a different command causing a different vibration pattern is received after another command is received. For example, while a threshold of 30 seconds may be used to determine whether to discard two same commands, a threshold of 15 seconds may be used to determine whether to discard two different commands. Furthermore, the commands need not all be received from monitoring device 140; in an embodiment, there are multiple monitoring devices 140, each corresponding to different members of a monitoring team, and the thresholds are used to discard a message from one monitoring device 140 of the monitoring team when another monitoring device 140 had previously transmitted a command within a corresponding threshold amount of time.

Customize haptics module 214 enables the transmitting person to customize haptics, either from scratch, or by editing default vibration patterns that were preset by an administrator. Customize haptics module 214 receives input from a user indicating a vibration pattern that is to be output by way of mobile bug 110 and/or peripheral device 115 when a command indicated by the user is detected. In an embodiment, customize haptics module 214 outputs a display to the user to input the command and corresponding vibration pattern. Customize haptics module 214 may receive input from the user of, when peripheral device 115 is detected, whether peripheral device 115, in addition to, or instead of, mobile bug 110 is to vibrate. Customize haptics module 214 may additionally receive input from the user of whether monitoring device 140 is to be notified that the vibration has successfully been executed.

Customize haptics module 214 may additionally receive input of visual data that is to be output by mobile bug 110 and/or peripheral device 115 when the command is detected. For example, the transmitting person may fear that if his or her mobile bug 110 and/or peripheral device 115 vibrates, a bad guy will become suspicious that the transmitting person is carrying a mobile bug. To mitigate the risk, the transmitting person may input that when a command is received, mobile bug 110 and/or peripheral device 115 is to vibrate according to the indicated vibration pattern, and a display is also to appear on mobile bug 110 and/or peripheral device 115 including content input by the transmitting user. The content may, for example, be a fake email notification, or text message notification, from one's parent or spouse asking when he or she will be coming home for dinner. The transmitting person may similarly authorize monitoring device 140 to include a message for display including content input by the member of the monitoring team.

After receiving input of a command, an associated vibration pattern, an indication of whether mobile bug 110 and/or peripheral device 115 is to vibrate, and/or an indication of whether monitoring device 140 is to be notified of a successful execution of a vibration pattern, customize haptics module 214 causes an entry to be added to haptics database 135. Existing entries of haptics database 135 may be customized using customized haptics module 214. Customize haptics module 214 may edit any parameter of entries of haptics database 135, whether created from scratch or default, based on user input. Customize haptics module 214 may cause mobile bug 210, or a display of another interface, to display existing commands and their corresponding parameters, and may accept user input that alters the commands and/or their corresponding parameters. Responsive to detecting an edit to an entry, customize haptics module 214 saves the edit to haptics database 135 (either by saving the edit locally where haptics database 135 is part of mobile bug 110, or by transmitting a command to monitoring service 130 to edit the entry where haptics database 135 is part of monitoring service 130).

Peripheral command module 215 transmits instructs to peripheral device 115 to vibrate according to a vibrate pattern when a command is detected. Where haptics output module 213 determines peripheral device 115 is to vibrate according to a vibrate pattern, peripheral command module 215 instructs peripheral device 115 to do so. Where haptics output module 213 does not instruct peripheral command module 215 to instruct, or refrain from instructing, peripheral device 115 to vibrate, notwithstanding that haptics output module 213 instructs mobile bug 110 to vibrate, peripheral command module 215 may determine whether to instruct peripheral device 115 to vibrate according to settings of mobile bug 110 (such as instructions where peripheral device 115 is to vibrate instead of, or in addition to, mobile bug 110 in preset circumstances).

Monitoring Service Details

Figure 3:
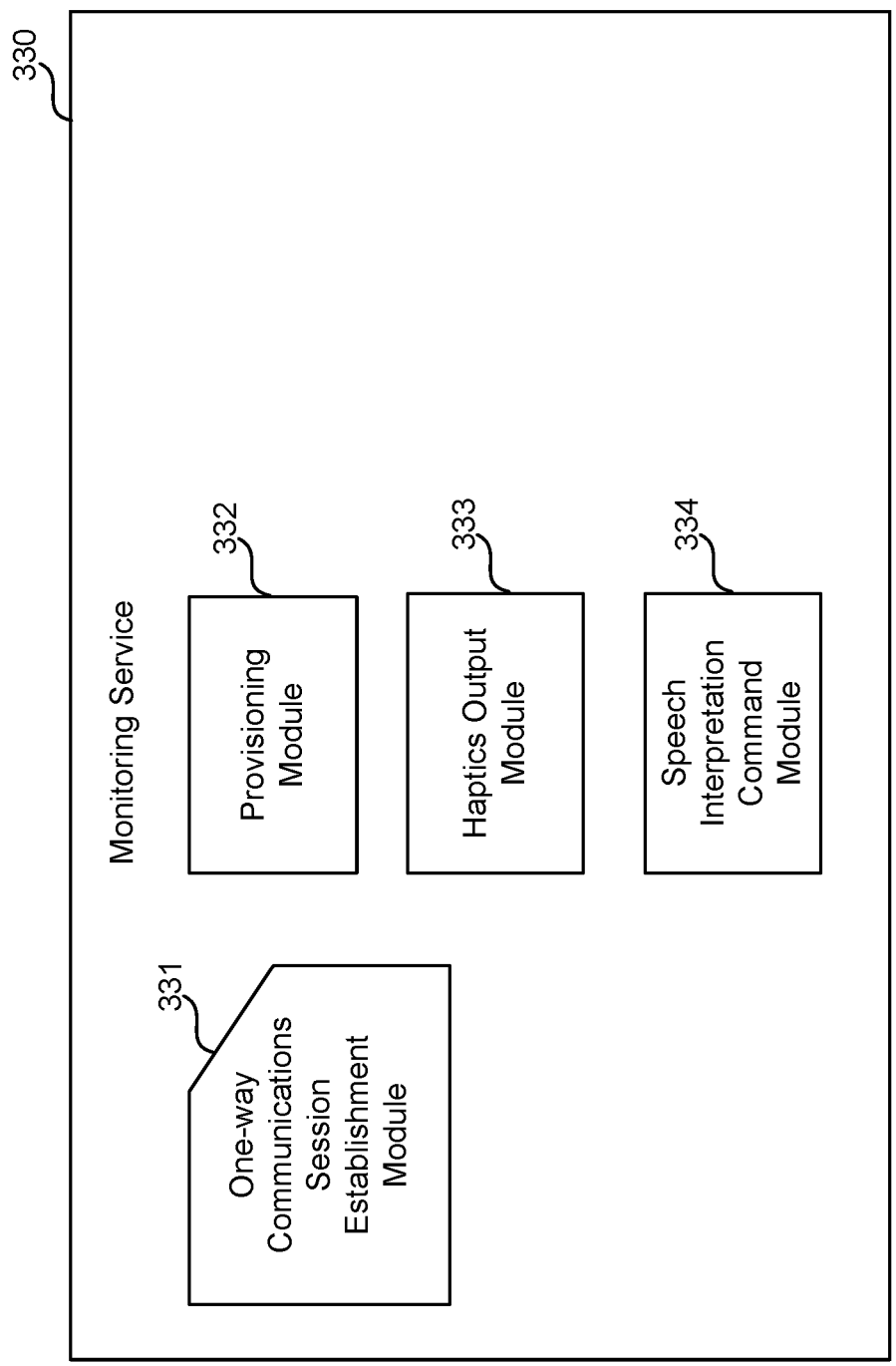
FIG. 3 illustrates one embodiment of a detailed view of modules within a monitoring service, including modules for outputting customized haptics.

FIG. 3 illustrates one embodiment of a detailed view of modules within a monitoring service. Monitoring service 330 includes all functionality described above with respect to monitoring service 130, and includes one-way communications session establishment module 331, provisioning module 332, haptics output module 333, and speech interpretation command module 334. One-way communications session establishment module 331 establishes a one-way communications session between mobile bug 110 and one or more monitoring devices including monitoring device 140, responsive to receiving an instruction to do so from mobile bug 110 and/or monitoring device 140. In an embodiment, one-way communications session establishment module 331 receives an instruction to establish the one-way communications session at a predetermined time, and waits until that predetermined time to establish the one-way communications session.

In order to establish a one-way communications session, monitoring service 130 executes provisioning module 332, which provisions various devices as mobile bugs and as monitoring devices. Based on the provisioning, one-way communications session establishment module determines which devices to establish the one-way communications session between. Further details on initial establishment of a one-way communications session and provisioning of mobile bugs and monitoring devices are described in commonly-owned U.S. Pat. No. 10,187,518, filed May 12, 2017, and issued Jan. 22, 2019, the disclosure of which is hereby incorporated by reference herein in its entirety.

Haptics output module 333 may detect a command that triggers monitoring service 330 to instruct mobile bug 110 to vibrate (and/or to cause mobile bug 110 to instruct peripheral device 115 to vibrate). Haptics output module 333 of monitoring service 330 carries the same functionality to haptics output module 213 unless otherwise noted, where commands to cause mobile bug 110 and/or peripheral device 115 are transmitted over network 120 to mobile bug 110. In an embodiment, haptics output module 333 detects commands from monitoring device 140 and compares the commands to entries of haptics database 135, to determine whether the command is associated with a vibration pattern to be output by mobile bug 110 and/or peripheral device 115. When a matching entry is found in database 135, haptics output module 333 instructs monitoring service 330 to transmit an instruction to mobile bug 110 to vibrate (and/or cause peripheral device 115 to vibrate) according to the vibration command. In another embodiment, haptics output module 333 transmits the command itself to mobile bug 110, which processes the command to determine whether to vibrate (and/or cause peripheral device 115 to vibrate).

Speech interpretation command module 334 detects speech from monitoring device 140 and determines whether the speech matches verbal or textual input indicated by entries of haptics database 135. For example, speech interpretation command module 334 may detect that a user of monitoring device 140 stated "holy cow, he really needs to get out of there!", and may determine, using machine learning algorithms, fuzzy matching algorithms, and the like, that this matches an SOS command. In response to detecting the match of the statement to an entry, speech interpretation command module 334 may automatically instruct mobile bug 110 to vibrate (and/or cause peripheral device 115 to vibrate) according to the pattern indicated by the entry. Alternatively, in response to detecting the match of the statement to the entry, speech interpretation command module 334 may instruct monitoring device 140 to provide a prompt asking the member of the monitoring team using monitoring device 140 whether he or she would like to cause mobile bug 110 to vibrate according to the pattern indicated by the entry (e.g., the pattern corresponding to SOS).

Monitoring Device Details

Figure 4:
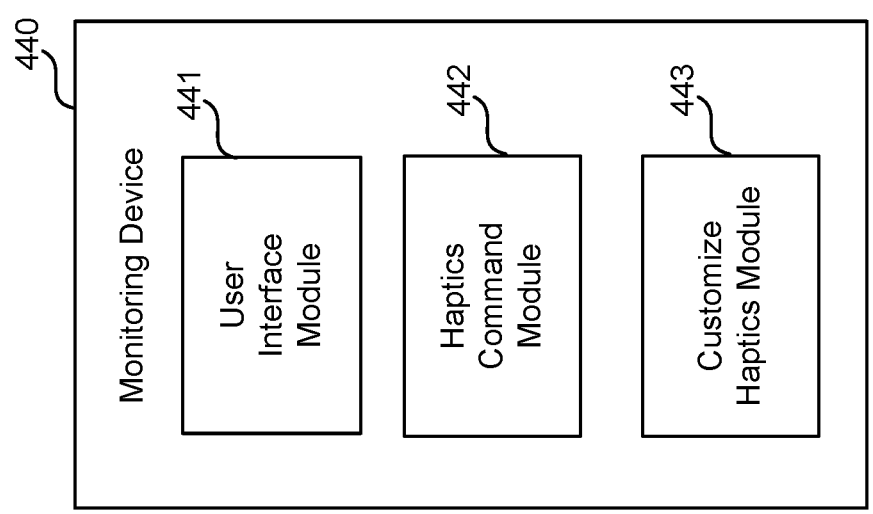
FIG. 4 illustrates one embodiment of a detailed view of modules within a monitoring device, including modules for outputting customized haptics at a mobile bug.

FIG. 4 illustrates one embodiment of a detailed view of modules within a monitoring device. Monitoring device 440 includes all functionality described above with respect to monitoring device 140, and includes user interface module 441, haptics command module 442, and customize haptics module 443. User interface module 441 provides a user interface through which a member of the monitoring team may enter commands or receive information. For example, a member of the monitoring team using monitoring device 440 may select a mobile bug 110 with which to request establishment of a one-way communications session, or to receive a notification that a one-way communications session has begun. User interface module 441 may output data (e.g., audio, GPS, etc.) to the member of the monitoring team during the one-way communications session.

User interface module 441 may provide a display, or audio output, of a menu of commands that may be sent to mobile bug 110 to cause mobile bug 110 (and/or peripheral device 115) to vibrate. The menu may be accessible while a one-way communications session between monitoring device 440 and mobile bug 110 is active. The menu includes selectable options that are populated with commands indicated by entries of haptics database 135 that are either default entries, or entries customized by the transmitting person using mobile bug 150. User interface module 441 may include an option to select an intensity with which a command is to be transmitted, which, when used, will adjust the intensity with which mobile bug 110 and/or peripheral device 115 vibrate when a command is issued. User interface module 441 may additionally include a microphone and a textual input interface. Words spoken or typed that are detected by user interface module 441 may provide feedback to haptics command module 442 and/or may be transmitted to haptics output module 333 to trigger a command based on fuzzy logic and/or machine learning algorithms, as discussed above with respect to FIG. 3. Alternatively, words spoken or typed that are detected by user interface module 441 may trigger haptics command module 442 to command mobile bug 110 to vibrate according to a pattern corresponding to the words (e.g., vibrate according to a Morse code representation of the words), and/or may transmit a command to haptics output module 333 to trigger a command to perform the same.

Haptics command module 442 commands haptics output module 333 and/or haptics output module 213 to cause mobile bug 110 to output haptics. Haptics command module 442 may, when issuing commands, transmit a notification to additional monitoring devices 440 of the monitoring team that the command was issued to mobile bug 110, to prevent other members of the monitoring team from needlessly issuing duplicative commands. In an embodiment, customize haptics module 443 accepts customized haptics from the member of the monitoring team using monitoring device 440. Customize haptics module 443 may cause user interface module 211 to display haptics customized by monitoring device 440 so that the transmitting person has a chance to get oriented with the haptics customized by the member of the monitoring team.

Computing Machine Architecture

Figure 5:
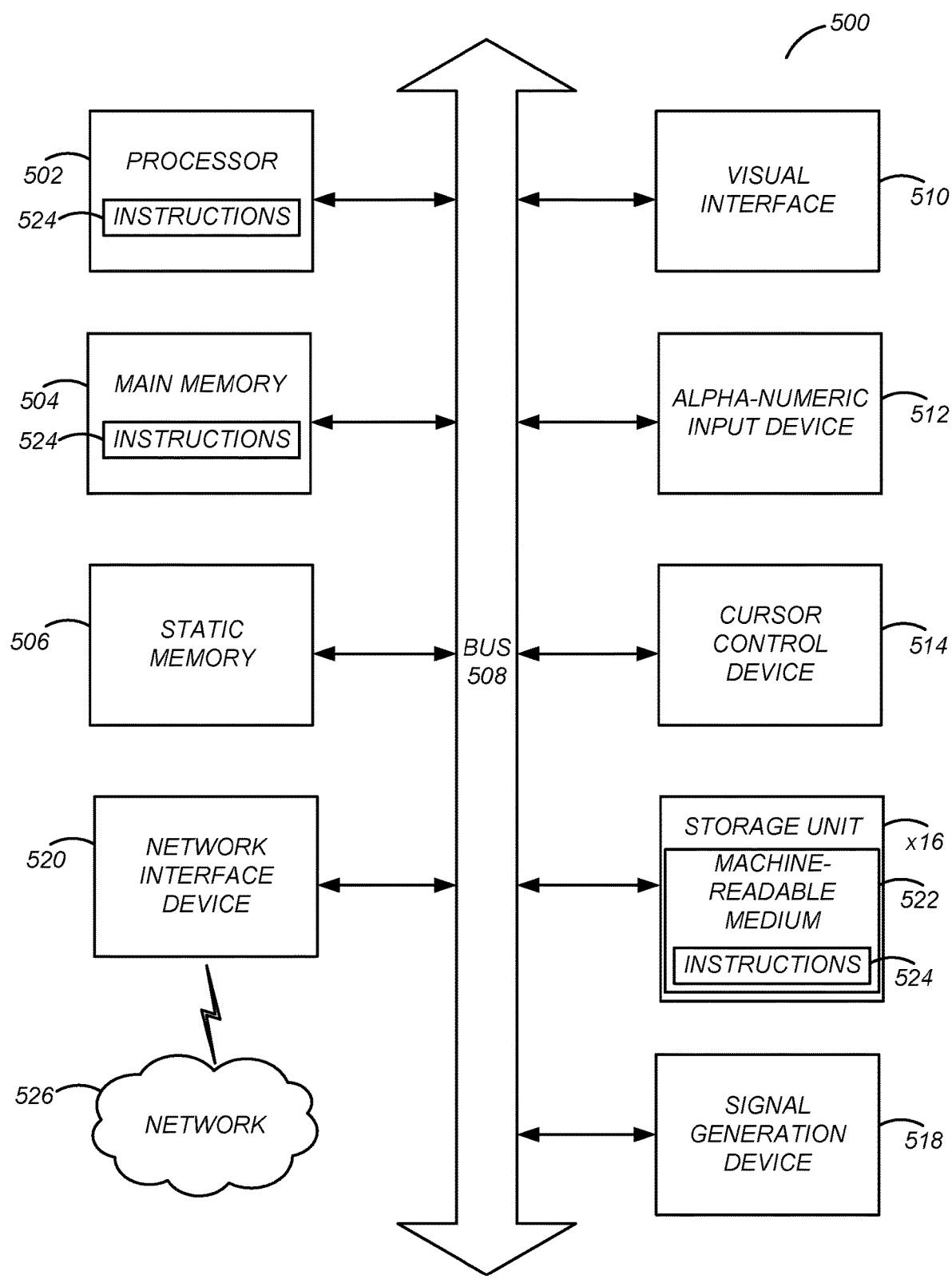
FIG. 5 illustrates one embodiment of a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller). The example machine may be used to implement mobile bug 110, monitoring service 130, and/or monitoring device 140. Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, a smart watch, or any machine capable of executing instructions 524 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Customized Haptics Data Flow

Figure 6:
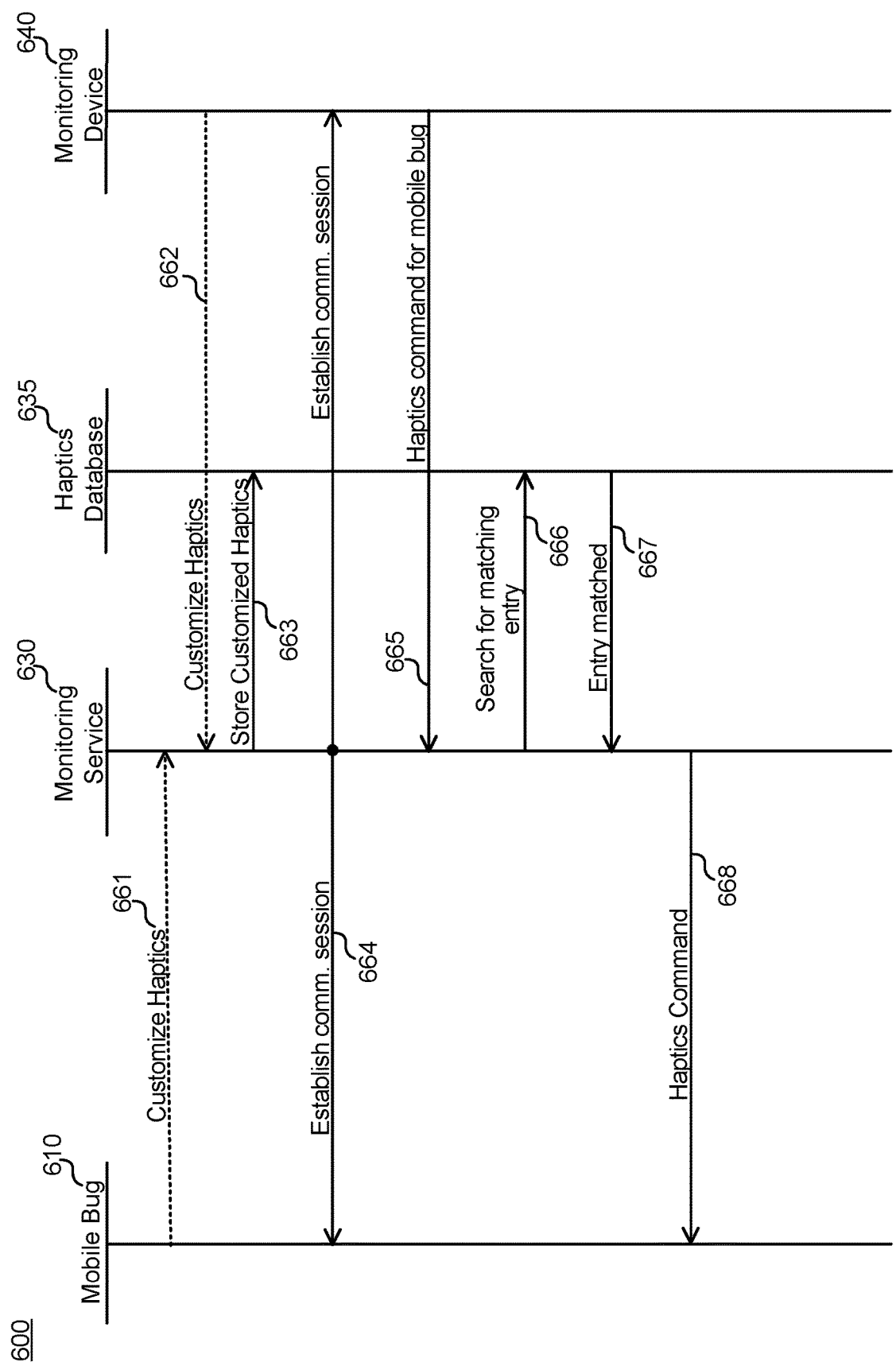
FIG. 6 illustrates one embodiment of a data flow diagram illustrating an exemplary data flow for causing a mobile bug to output customized haptics.

FIG. 6 illustrates one embodiment of a data flow diagram illustrating an exemplary data flow for causing a mobile bug to output customized haptics. Data flow 600 includes a flow of data from mobile bug 610, monitoring service 630, haptics database 635, and monitoring device 640, and may additionally include a flow of data from undepicted devices (e.g., peripheral device 115, additional monitoring devices, etc.). Each of mobile bug 610, monitoring service 630, haptics database 635, and monitoring device 640 carry the same functionality as their similarly-numbered counterparts in FIGS. 1-4.

Data flow 600 begins with the optional elements of mobile bug 610 transmitting 661 a request to create an entry for customized haptics, and/or monitoring device 640 transmitting 662 a request to create an entry for customized haptics, to monitoring service 630. Alternatively, customize haptics requests may be sent directly to haptics database 635 (e.g., haptics database 635 is stored at mobile bug 610), or no haptics are customized, and rather, default haptics are to be used. Customized haptics database 635 stores 663 entries corresponding to the customized haptics requests. Monitoring service 630 establishes 664 a one-way communications session between monitoring device 640 and mobile bug 610. While data flow 600 depicts monitoring service 630 acting as an intermediary after the one-way communications session is established, this is merely an exemplary embodiment; the data flow from 665 through 668 may occur directly between monitoring device 640 and mobile bug 610, with direct communications to haptics database 635, without monitoring service 630 acting as an intermediary.

During the one-way communications session, monitoring device 640 transmits 665 a haptics command for mobile bug 610. As depicted, the haptics command is transmitted to monitoring service 630, though the haptics command may be transmitted directly to mobile bug 630. Monitoring service 630 (or mobile bug 610) transmits 666 a search to haptics database 635 for a matching entry, which returns 667 a matching entry if found. Where the command was sent to monitoring service 630, monitoring service 630 transmits 668 a haptics command, which causes mobile bug 610 to execute the haptics command. Where the command was sent to mobile bug 610, mobile bug 610 executes the haptics command without receiving further data. While undepicted, where warranted (as described above with respect to FIG. 2), mobile bug 610 may command peripheral device 115 to vibrate. Mobile bug 610 and/or monitoring service 630 may discard haptics commands that are received within a threshold distance of one another, as described above with respect to FIG. 4.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for alerting a transmitting person of a circumstance based on haptics output by a mobile bug during a one-way communications session through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for activating haptics during a one-way communications session with a mobile bug, the method comprising:
   establishing a one-way communications session between a mobile bug and a monitoring device;
   receiving, from the monitoring device, a request to notify a user of the mobile bug of a circumstance;
   comparing data of the request to entries of a database;

identifying, based on the comparing, an entry of the request that matches the data;
determining a haptic output indicated by the entry; and
causing the mobile bug to vibrate according to the haptic output.

2. The method of claim 1, wherein establishing the communications session comprises establishing a rule that prevents the mobile bug from outputting data by way of a user interface of the mobile bug.

3. The method of claim 2, wherein identifying the entry comprises identifying, within the entry, a command corresponding to the data of the request, the command comprising an instruction to override the rule and enable the mobile bug to output data by way of a haptics component of the user interface of the mobile bug.

4. The method of claim 1, further comprising:
detecting a command from the mobile bug to output a particular vibration pattern in response to detecting a symbol; and
storing, within the entry, the symbol, and the particular vibration pattern, wherein identifying the entry of the request that matches the data comprises identifying the entry based on the data including the symbol, and wherein the haptic output comprises the particular vibration pattern.

5. The method of claim 1, wherein the database comprises a plurality of entries, each entry including a symbol, that, when detected in a communication from the monitoring device, causes a customized vibration pattern to be output by the mobile bug.

6. The method of claim 5, wherein the customized vibration pattern is defined by at least one of the user of the mobile bug, and a user of the monitoring device.

7. The method of claim 1, wherein the mobile bug, responsive to receiving the command, commands a peripheral device that is operably coupled to the mobile bug to vibrate according to the haptic output.

8. The method of claim 7, wherein the mobile bug determined to command the peripheral device, rather than the mobile bug, to vibrate based on information in the entry.

9. The method of claim 1, further comprising:
receiving an additional request from an additional monitoring device;
determining whether a threshold period of time has passed since a time at which the command was sent to the mobile bug; and
in response to determining that the threshold period of time has not passed, discarding the additional request.

10. The method of claim 9, further comprising, further in response to determining that the threshold period of time has not passed, transmitting a notification to the additional monitoring device indicating that the command was sent to the mobile bug.

11. A non-transitory computer-readable medium comprising executable instructions encoded thereon for activating haptics during a one-way communications session with a mobile bug, the instructions, when executed by at least one processor, causing the at least one processor to perform operations, the instructions comprising instructions to:
establish a one-way communications session between a mobile bug and a monitoring device;
receive, from the monitoring device, a request to notify a user of the mobile bug of a circumstance;
compare data of the request to entries of a database;
identify, based on the comparing, an entry of the request that matches the data;
determine a haptic output indicated by the entry; and
cause the mobile bug to vibrate according to the haptic output.

12. The non-transitory computer-readable medium of claim 11, wherein the instructions to establish the communications session comprise instructions to establish a rule that prevents the mobile bug from outputting data by way of a user interface of the mobile bug.

13. The non-transitory computer-readable medium of 12, wherein the instructions to identify the entry comprise instructions to identifying, within the entry, a command corresponding to the data of the request, the command comprising an instruction to override the rule and enable the mobile bug to output data by way of a haptics component of the user interface of the mobile bug.

14. The non-transitory computer-readable medium of 11, further comprising instructions to:
detect a command from the mobile bug to output a particular vibration pattern in response to detecting a symbol; and
store, within the entry, the symbol, and the particular vibration pattern, wherein identifying the entry of the request that matches the data comprises identifying the entry based on the data including the symbol, and wherein the haptic output comprises the particular vibration pattern.

15. The non-transitory computer-readable medium of 11, wherein the database comprises a plurality of entries, each entry including a symbol, that, when detected in a communication from the monitoring device, causes a customized vibration pattern to be output by the mobile bug.

16. The non-transitory computer-readable medium of 15, wherein the customized vibration pattern is defined by at least one of the user of the mobile bug, and a user of the monitoring device.

17. The non-transitory computer-readable medium of 11, wherein the mobile bug, responsive to receiving the command, commands a peripheral device that is operably coupled to the mobile bug to vibrate according to the haptic output.

18. The non-transitory computer-readable medium of 17, wherein the mobile bug determined to command the peripheral device, rather than the mobile bug, to vibrate based on information in the entry.

19. The non-transitory computer-readable medium of 11, further comprising instructions to:
receive an additional request from an additional monitoring device;
determine whether a threshold period of time has passed since a time at which the command was sent to the mobile bug; and
in response to determining that the threshold period of time has not passed, discard the additional request.

20. The non-transitory computer-readable medium of 19, further comprising instructions to, further in response to determining that the threshold period of time has not passed, transmit a notification to the additional monitoring device indicating that the command was sent to the mobile bug.

* * * * *